(12) United States Patent
Stoye

(10) Patent No.: US 9,165,538 B2
(45) Date of Patent: Oct. 20, 2015

(54) IMAGE GENERATION

(71) Applicant: DisplayLink (UK) Limited, Cambridge (GB)

(72) Inventor: William Stoye, Cambridge (GB)

(73) Assignee: DisplayLink (UK) Limited, Cambridge (GB)

( * ) Notice: Subject to any disclaimer, the term of this patent is extended or adjusted under 35 U.S.C. 154(b) by 323 days.

(21) Appl. No.: 13/798,309

(22) Filed: Mar. 13, 2013

(65) Prior Publication Data
US 2014/0267321 A1 Sep. 18, 2014

(51) Int. Cl.
G09G 5/00 (2006.01)
G09G 5/395 (2006.01)

(52) U.S. Cl.
CPC ...................................... G09G 5/395 (2013.01)

(58) Field of Classification Search
CPC combination set(s) only.
See application file for complete search history.

(56) References Cited

U.S. PATENT DOCUMENTS

| | | | |
|---|---|---|---|
| 5,321,750 A * | 6/1994 | Nadan | 380/230 |
| 6,549,666 B1 | 4/2003 | Schwartz | |
| 6,781,711 B1 | 8/2004 | Rijavec et al. | |
| 7,197,190 B1 | 3/2007 | Andrew | |
| 2003/0118241 A1 | 6/2003 | Zandi et al. | |
| 2004/0117538 A1 | 6/2004 | Liu | |
| 2004/0130505 A1 | 7/2004 | Lee et al. | |
| 2007/0074505 A1 | 4/2007 | Ogawa et al. | |
| 2008/0049041 A1 | 2/2008 | Kobayashi et al. | |
| 2008/0198933 A1 | 8/2008 | Srinivasan et al. | |
| 2009/0074052 A1 | 3/2009 | Fukuhara et al. | |
| 2009/0274382 A1 | 11/2009 | Lin et al. | |
| 2010/0220783 A1 * | 9/2010 | Mallat et al. | 375/240.03 |

FOREIGN PATENT DOCUMENTS

| | | |
|---|---|---|
| EP | 0653727 B1 | 6/2000 |
| EP | 1975916 A2 | 1/2008 |
| GB | 2330473 A | 4/1999 |
| JP | 2002135593 A | 5/2002 |
| JP | 2003326758 | 11/2003 |
| WO | 9957908 | 11/1999 |
| WO | 0175583 B1 | 10/2001 |
| WO | 2008027875 A2 | 3/2008 |

OTHER PUBLICATIONS

Examination Report in GB Application No. 1017882.0, mailed Mar. 17, 2014, 2 pages.
Further Examination Report in GB Application No. 1017882.0, mailed Jul. 3, 2014, 3 pages.

* cited by examiner

*Primary Examiner* — M Good Johnson
(74) *Attorney, Agent, or Firm* — Edell, Shapiro & Finnan, LLC

(57) ABSTRACT

A method of generating an image comprises receiving a signal over a USB interface comprising encoded display data for one or more rectangular group of pixel tiles within an image and position data for the or each group of pixel tiles. The coefficients are obtained from the encoded display data, maybe by converting variable bit length fields into AC coefficients and an inverse Haar transform performed on them to generate pixel data for each rectangular group of pixel tiles. A frame buffer, which may be part of the display, is then updated with the generated pixel data ready for output to the display device. Copy protection may also be incorporated using AES negotiated over HDPC.

26 Claims, 4 Drawing Sheets

IMAGE GENERATION

BACKGROUND OF THE INVENTION

This invention relates to a method of generating an image and to a device for generating an image.

In desktop computing, it is now common to use more than one display device. Traditionally, a user would have a computer with a single display device attached, but now it is possible to have more than one display device attached to the computer, which increases the usable display area for the worker. For example, International Patent Application Publication WO 2007/020408 discloses a display system which comprises a plurality of display devices, each displaying respectively an image, a data processing device connected to each display device and controlling the image displayed by each display device, and a user interface device connected to the data processing device. Connecting multiple display devices to a computer is a proven method for improving productivity.

The connection of an additional display device to a computer presents a number of problems. In general, most computers will be provided with only one dedicated video output port such as a VGA output connection. One method by which a second display device can be added to a computer is by adding an additional graphics card to the internal components of the computer, which will have an additional graphics output port. The additional graphics card will provide an additional video output which will allow the second display device to be connected to the computer. However, this solution is relatively expensive and is not suitable for many non-technical users of computers, for whom physically correctly adding the additional video card to their computer is a difficult task.

An alternative method of connecting the second display device is to connect the additional display device to a USB socket on the computer, as, in general, all modern computers are provided with multiple USB sockets. This provides a simple connection topology for the user, but requires additional hardware and software to be present, as in general, USB has a bandwidth that makes the provision of a good quality video output a non-trivial task. It is also desirable that any additional hardware between the computer and the display device is kept as simple as possible, in order to keep down the cost of this solution of adding an additional display device. This means that when connecting an additional display device using a limited bandwidth technology such as USB, certain complex tasks can be difficult to achieve. This is particular the case as desktop computers are more frequently being used to output video, for example through websites such as the You Tube® website.

SUMMARY OF THE INVENTION

It is therefore an object of the invention to improve upon the known art.

According to a first aspect of the present invention, there is provided a method of generating an image comprising receiving a signal comprising encoded display data for one or more rectangular groups of pixel tiles within an image and position data for the or each group of pixel tiles, obtaining coefficients from the encoded display data, performing an inverse Haar transform on the obtained coefficients to generate pixel data for the or each rectangular group of pixel tiles, updating a frame buffer with the generated pixel data, and outputting at least a portion of the frame buffer.

According to a second aspect of the present invention, there is provided a device for generating an image comprising a receiver arranged to receive a signal comprising encoded display data for one or more rectangular groups of pixel tiles within an image and position data for the or each group of pixel tiles, a processor arranged to obtain coefficients from the encoded display data, to perform an inverse Haar transform on the obtained coefficients to generate pixel data for the or each rectangular group of pixel tiles and to update a frame buffer with the generated pixel data, and an output device arranged to output at least a portion of the frame buffer.

According to a third aspect of the present invention, there is provided a method of generating an image comprising encoding display data for one or more rectangular groups of pixel tiles within an image and position data for each of the rectangular groups of pixel tiles, the display data being less than the display data for an entire image, the encoding using a Haar transform for each pixel tile, transmitting an encoded signal of the encoded display data to a display control device, receiving the signal comprising encoded display data for one or more rectangular groups of pixel tiles within an image and position data for the or each group of pixel tiles, obtaining coefficients from the encoded display data, performing an inverse Haar transform on the obtained coefficients to generate pixel data for the or each rectangular group of pixel tiles, updating a frame buffer with the generated pixel data, and outputting at least a portion of the frame buffer.

According to a fourth aspect of the present invention, there is provided a system for generating an image comprising a computer arranged to encode display data for one or more rectangular groups of pixel tiles within an image and position data for each of the rectangular groups of pixel tiles, the display data being less than the display data for an entire image, the encoding using a Haar transform for each pixel tile and transmit an encoded signal of the encoded display data to a display control device, a display control device comprising a receiver arranged to receive a signal comprising encoded display data for one or more rectangular groups of pixel tiles within an image and position data for the or each group of pixel tiles, a processor arranged to obtain coefficients from the encoded display data, to perform an inverse Haar transform on the obtained coefficients to generate pixel data for the or each rectangular group of pixel tiles and to update a frame buffer with the generated pixel data, and an output device arranged to output at least a portion of the frame buffer.

Owing to the invention, it is possible to provide an effective solution to the problem of providing video over a restricted bandwidth such as USB to a level of sufficient quality that the end user will not see a noticeable difference in the appearance of the ultimate image, when compared to standard techniques carried over dedicated graphics channels such as VGA. The device of the invention can be employed, for example, between a computer and an additional display device and will receive a USB input and provide a VGA output.

The Haar transform is not optimal for typical photographic data compression but is very appropriate for the compression of arbitrary screen images for a computer system, for two reasons. The first reason is that screen compression must be very fast, so that it can be applied to the entire computer screen many times per second without causing undue load on the computer's CPU. The second is that computer screens may show photographic information but may also show images such as a page of writing or graphical information. In these cases it is very important that sharp edges are preserved, even if at the expense of precise colour fidelity. The Haar transform performs well in both these cases.

In one embodiment, the device for generating an image is a decoder for decoding the encoded display data which uses entropy coding of AC coefficients and using this to indicate encoding of the parameters of a Haar transform, the Haar transform being of AC coefficients of YCrCb channels of a visual image with the resulting encoding being received over USB by a USB 2.0 or SS USB device, where preferably, the output of the device is being protected against copy protection using AES, negotiated using HDPC.

Preferably, AC coefficients are ordered so that trailing coefficients represent highest-frequency data, and trailing zero coefficients may be omitted. The reason for this is that in many typical computer display images there are large areas where adjacent pixels are identical, or have very similar values. The highest frequency information in the Haar transform consists of the difference in value between adjacent pixels, and in practice the values are often zero. By ordering the values to leave these at the end, and omitting trailing zero values, compression is typically improved.

Advantageously, colour information is represented in the YCrCb colour space. The reason for this is that typical computer display images contain much of their information as changes in brightness (Y) and so the chroma values (CrCb) tend to be more easily compressible. In image compression systems for photographic data (such as JPEG, MPEG) the chroma data is subsampled, but for computer displays it is important not to do this. For instance, it would mean that coloured writing in a word processor or spreadsheet would be blurred by such a subsampling process, which is unacceptable to the user.

The device is structured so that a low compute load is placed on the host system to encode and transmit the video data with very low latency caused by the sequence of encoding, transmitting over USB, decoding and displaying so that a human user finds the USB-connected display to be an acceptable replacement for a display connected via a dedicated video signal cable. The video encoded format is suitable both for photographic data and for computer desktop displays. Existing image compression approaches split between approaches which are ideally suited for photographic or movie data, for example, MPEG and other such codecs, which would not do a good job of computer desktop displays and lossless frame buffer transmission, which performs very poorly when the user plays a movie or displays photographic information.

The decoding method and device of the invention combines these two approaches, thereby providing complete fidelity when required for desktop displays, yet performing reasonably well in the presence of photographic information, in a format which is suitable for very low latency encoding and decoding. The result does not achieve the very high compression ratios of codecs such as MPEG, but is better suited than MPEG for the attachment of visual displays via low cost networks and serial buses.

In a preferred embodiment, the video decoding device (embodied as a silicon chip or an end user product) receives an encoded video signal, decodes the video signal, and outputs the decoded signal to a video display 30 device over a video link such as HOMI, OVI, OP, such that the encoded signal arrives over some variant of the USB interface as standardised by the USB-IF, and the encoded signal makes use of the Haar transform for each 8×8 pixel square of the source images, in each colour channel, AC coefficients of each Haar transform are encoded as variable length bit fields, where the variable encoding is defined using a simple and compact UseVec form (consistent with the definition in the background section). The AC coefficients are ordered so that trailing coefficients represent highest-frequency data, and trailing zero coefficients may be omitted; the colour channels are all at the same resolution, with no subsampling of chroma channels being performed, except as dynamically determined by the number of coefficients provided to the Haar transforms. The encoded signal format is divided into groups of 8×8 tiles so that partial updates of video frame may be performed. Each tile group separately identifies its intended location in the displayed image so that local changes to not require a complete frame update. Each tile group contains fewer than twenty 8×8 tiles and the decoded signal is sent to a video raster display port such as HOMI, OVI, DisplayPort, or is displayed directly on a visual display which forms part of the device.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE DRAWINGS

Embodiments of the present invention will now be described, by way of example only, with reference to the accompanying drawings, in which:—

DETAILED DESCRIPTION

Figure 1:
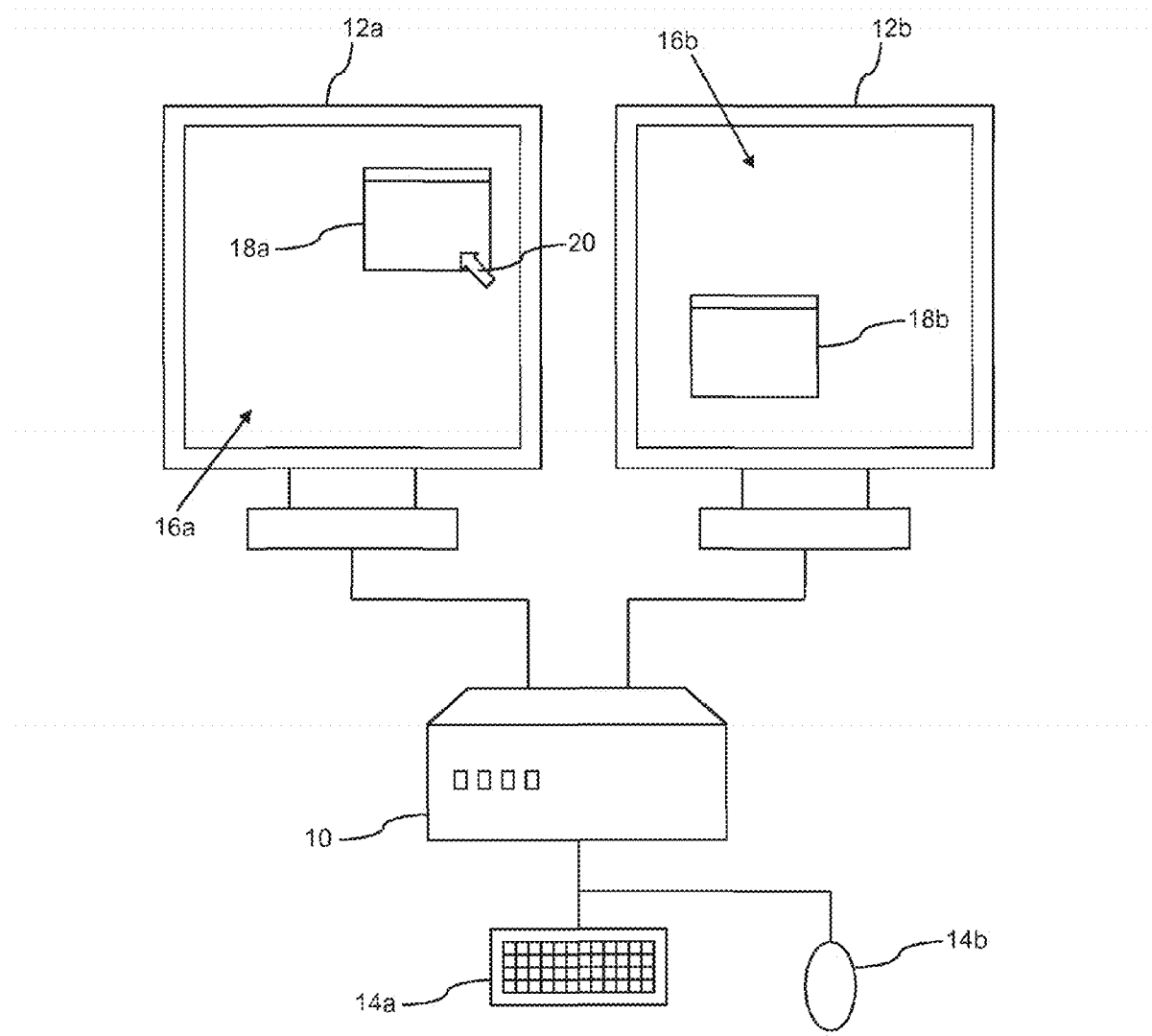
FIG. 1 is a schematic diagram of a display system.

A display system is shown in FIG. 1. The system comprises a processing device 10, display devices 12 and user interface devices 14. The user interface devices are a keyboard 14a and a mouse 14b. The system shown in FIG. 1 is a standard desktop computer, with an additional display device 12b, which is composed of discrete components that are locally located but could equally be a device such as a laptop computer or suitably enabled handheld device such as a mobile phone or pda (personal digital assistant) all using an additional display 12b. Similarly, the system may comprise part of a networked or mainframe computing system, in which case the processing device 10 may be located remotely from the user input devices 14 and the display devices 12, or indeed may have its function distributed amongst separate devices.

The display devices 12 show images 16, and the display of the images 16 is controlled by the processing device 10. One or more applications are running on the processing device 10 and these are represented to the user by corresponding application windows 18, with which the user can interact in a conventional manner. A cursor 20 is shown, and the user can control the movement of the cursor 20 about the images 16 shown on the display device 12 using the computer mouse 14b, again in a totally conventional manner. The user can perform actions with respect to any running application via the user interface device 14 and these actions result in corresponding changes in the images 16, displayed by the display device 12.

The operating system run by the processing device 10 uses virtual desktops to manage the multiple display devices 12. Each physical display device 12 is represented by a frame buffer that contains everything currently shown on that display device 12. The operating system is configured to arrange these frame buffers into a single virtual desktop. When these frame buffers are arranged in the virtual desktop 22 in the same relative positions in which the physical display devices 12 are relatively placed, then the operating system can draw objects on all the display devices 12 in a natural way. The virtual desktop is a combination of the respective images 16a and 16b being shown by the display devices 12. If the user moves the mouse 14a such that the cursor 20 moves right off the edge of one display device 12a, then the cursor 20 appears on the left of the display device 12b to the right. Similarly a window 18 spread across several display devices 12 appears properly lined up between the display devices 12.

Figure 2:
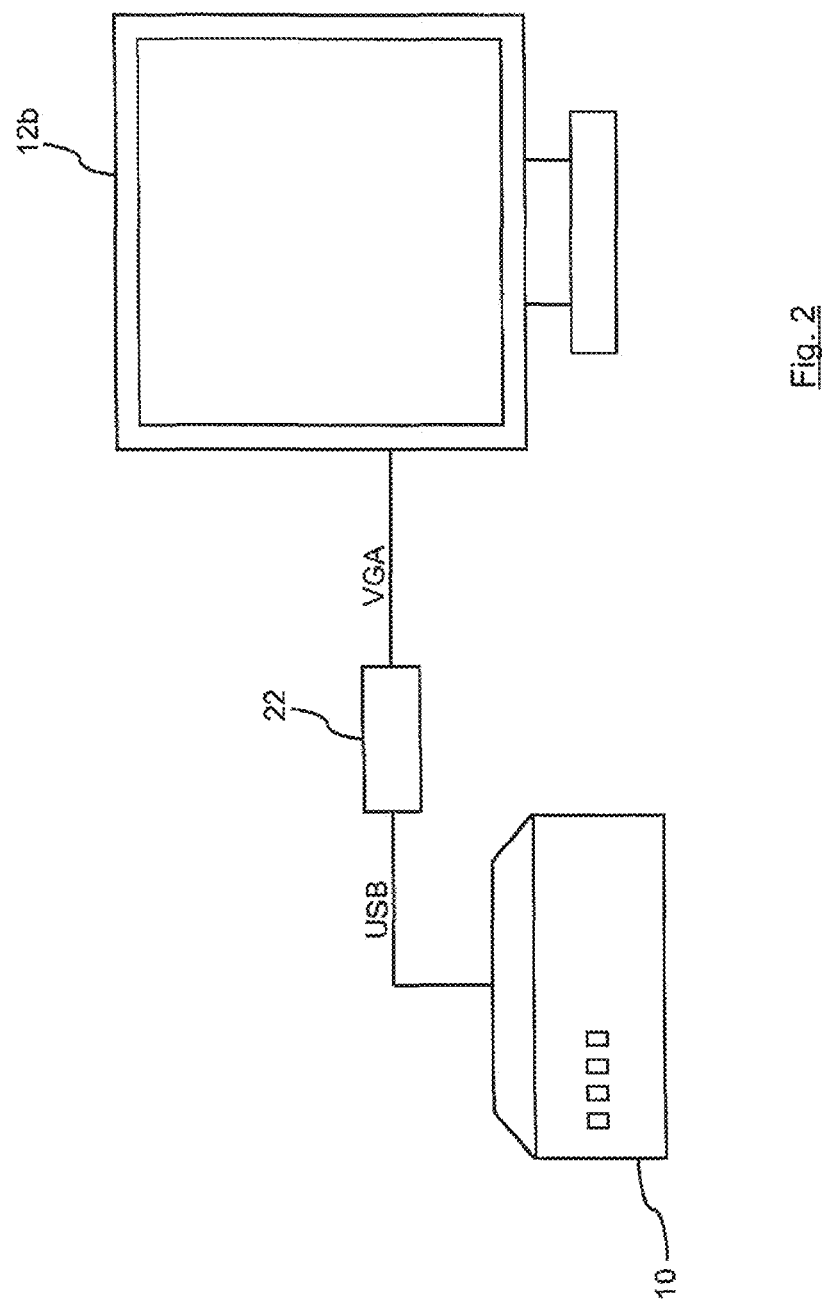
FIG. 2 is a schematic diagram of components of the display system.

More detail of the connection of the secondary display device 12b to the processing device 10 is shown in FIG. 2. The processing device 10 connects to the secondary display device 12b via a display control device 22. The display control device 22 is connected to the processing device 10 via a standard USB connection, and appears to the processing device 10 as a USB connected device. Any communications between the processing device 10 and the display control device 22 are carried out under the control of a USB driver specifically for the display control device 22. Such devices allow the connection of the secondary display device 12b to the processing device 10 without the need for any hardware changes to the processing device 10.

The display control device 22 connects to the display device 12b via a standard VGA connection, and the display device 12b is a conventional display device 12 which requires no adjustment to operate in the display system shown in FIG. 2. As far as the display device 12b is concerned, it could be connected directly to the graphics card of a processing device; it is unaware that the graphical data displayed by the display device 12b has actually been first sent via a USB connection to an intermediate component, the display control device 22. Multiple additional display devices 12 can be 15 connected to the processing device 10 in this way, as long as suitable USB slots are available on the processing device 10.

The display control device 22 is external to the processing device 10 and is not a graphics card. It is a dedicated piece of hardware that receives graphical data via the USB connection from the processing device 10 and transforms that graphics data into a VGA format that will be understood by the display device 12b. In topological terms USB and VGA are only examples of data standards that can be used to connect the additional display device 12b to the processing device 10. The general principle is that a general-purpose data network (such as USB or Ethernet) connects the processing device 10 to the display control device 22 and a display-specific data standard (such as VGA or DVI) is used on the connection from the display control device 22 to the display device 12b.

Figure 3:
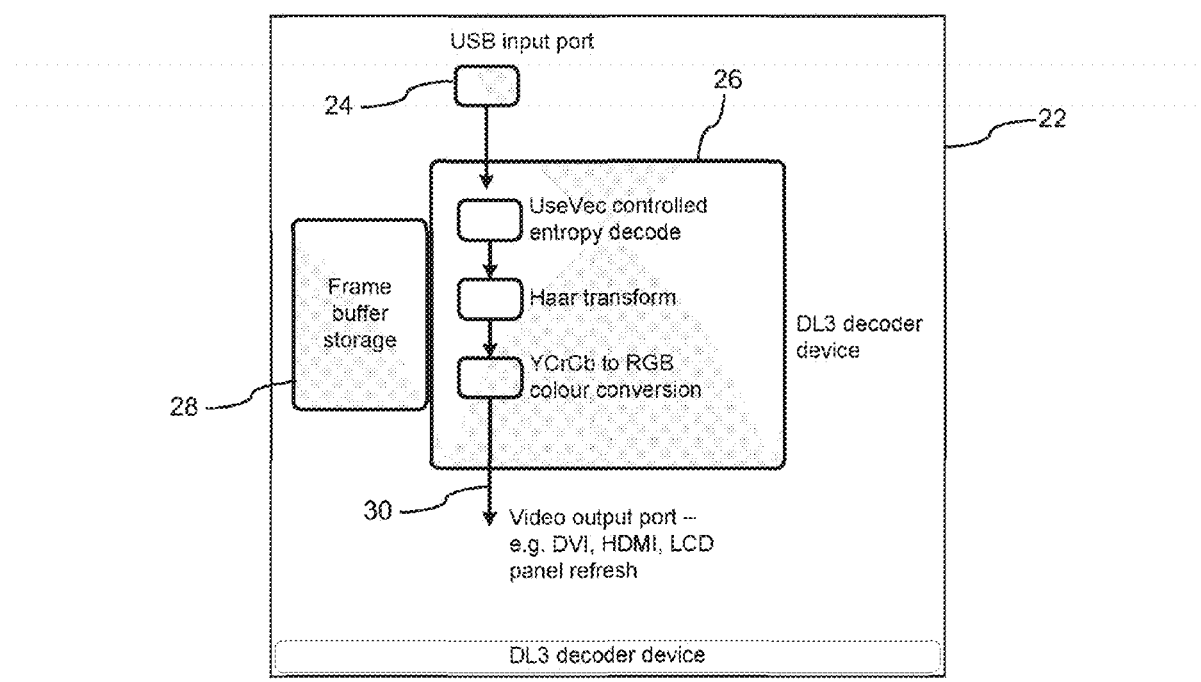
FIG. 3 is a schematic diagram of a display control device.

The display control device 22 is shown in more detail in FIG. 3. The device 22 operates to receive encoded display data via a USB input port 24, which is processed with a processor 26 that is connected to a frame buffer 28 and provides an output via an output port 30. The device 22 is for generating the image 16b that is displayed by the additional display device 12b. The device 22 is effectively an image decoder, as it receives encoded display data which is then decoded to pixel data that is stored within the frame buffer 28. The display control device 22 is a lightweight piece of hardware for adding an additional display 12b to a computer 10.

The incoming signal received by the USB input port 24 comprises encoded display data for one or more rectangular groups of pixel tiles within the image 16b and also position data for each of the rectangular groups of pixel tiles. This display data is less than the display data for an entire image, and reduces the amount of data that has to be transmitted between the computer 10 and the display control device. A pixel tile comprises an 8×8 array of pixels and the group size could be sixteen pixel tiles, for example, in a 4×4 array of tiles. Essentially only an update of part of the image 16b is being sent.

The processor 26 takes the encoded tiles and decodes these tiles into pixel data and updates the frame buffer 28 with the new decoded pixel data according to the position data in the received signal. In this way, the frame buffer 28 will always maintain pixel data for the entire image 16b, and this pixel data is continuously being updated by the processor 26. The processor 26 will then output at least a portion of the frame buffer contents via the output port 30 to the display device 12b over the VGA connection. The display control device 22 is configured as a dedicated piece of hardware for the decoding process.

FIG. 3 shows one embodiment of the display control device 22, which includes a dedicated frame buffer 28. In other solutions, the frame buffer 28 may not be part of the device 22, but may be present on another separate chip, in which case the processor 26 writes to that frame buffer 28 via a 25 suitable external output port. The device 22 may not be a separate device as shown in FIG. 2, but may form part of the actual display device 12. In this case, the output device 30 is not an output port as such, but is the actual display device 12, which is written directly from the frame buffer 28.

Figure 4:
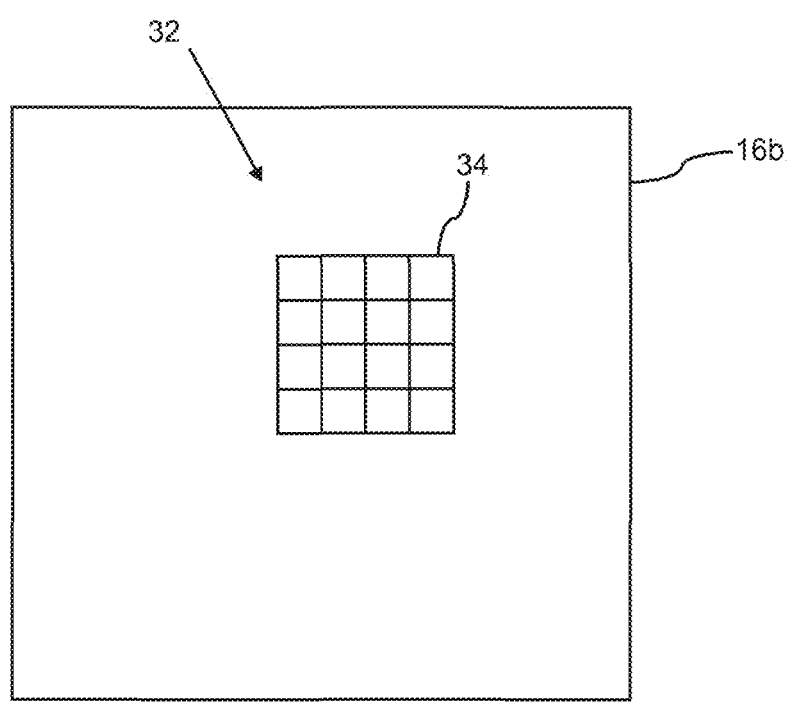
FIG. 4 is a schematic diagram of an image showing a group of pixel tiles.

FIG. 4 illustrates the concept of a group 32 of pixel tiles 34 within an image 16b. The image 16b is the image that is being displayed by the secondary display device 12b. This image 16b is stored in the frame buffer 28 of the display controller 22. To update this image 16b, then one or more groups 32 of pixel tiles 34 is transmitted via the USB connection to the display control device 22. The display control device 22 receives the signal comprising the encoded display data, decodes that data and updates the frame buffer 28 accordingly. The frame buffer 28 is then read out via the port 30 to the display device 12b.

In FIG. 4 only a single group 32 of pixel tiles 34 is shown. The system can be configured so that the number of tiles 34 within a group 32 is flexible, but generally it is desirable to limit the number of tiles 34 in a group 32 to no more than twenty. The group 34 can be located anywhere within the image 16b, and hence the need to include position information in the signal between the computer 10 and the display control device 22. The position information is used by the device 22, when writing the decoded pixel data into the frame buffer 28. Only the relevant part of the frame buffer 28 is updated.

Although it is not necessarily the case that all of the tiles 34 within the group 32 have actually changed from one frame to another, the structure of the display data in the signal that is carried from the computer 10 to the display control device 22 is such that all of the tiles 34 within the group 32 must be encoded and transmitted to the display control device 22. The selection of the position of the group 32 in the image 16b is made by the computer 10, on the 20 basis of capturing the most pixel tiles 34 that have changed between two consecutive frames, in the most efficient manner.

The operation of the device 22 is optimised for low latency, high visual fidelity, and low encoding computation effort. These requirements are driven by the application of forwarding video displays including desktop displays and more dynamic desktop video. When a desktop display is used complete or near-complete fidelity to the original source material is required. When video information is presented, greater loss may be introduced. The result does not achieve the very high compression ratios of codecs such as MPEG, but is better suited than MPEG for the attachment of visual displays via low cost networks and serial buses.

The frame buffer 28 is designed for storing the image 16b so that the video output port 30 can refresh the display 12b without any traffic over the USB input port 24. The frame buffer 28 can be in any internal format; may be in the data input format, or a rectangular pixel map in RGB or YCrCb, or some other format. The frame buffer 28 may be double-buffered or triple buffered to reduce tearing when rapidly updating the display. The frame buffer 28 may be on-chip memory, or external memory chips such as some DRAM technology.

The video decoding device 22 (as a silicon chip or an end user product) receives an encoded video signal, decodes the video signal, and outputs the decoded signal to a video display device 12b over a video link such as HOMI, OVI, OP. The encoded signal arrives over a USB interface as standardised by the USB-IF and the encoded signal format is divided into rectangular groups of 8×8 pixel tiles with each tile group including an explicit screen position, so that partial updates of the video frame may be performed. Each tile group separately identifies its intended location in the displayed image so that local changes to the displayed image do not require a complete frame update. Each 15 tile group contains fewer than twenty 8×8 tiles.

The encoded signal makes use of the Haar transform for each 8×8 pixel square of the source images, in each colour channel. AC coefficients of each Haar transform are encoded as variable length bit fields, where the variable encoding is defined using a simple and compact entropy form. The decoded signal is sent to a video raster display port such as HOMI, OVI, DisplayPort, or is displayed directly on a visual display which forms part of the device. The device 22 refreshes the image as required at the video link port by means of a frame buffer which stores the current image in some suitable format.

Although an embodiment has been described in detail above, it will be appreciated that various changes, modifications and improvements can be made by a person skilled in the art without departing from the scope of the present invention as defined in the claims.

The invention claimed is:

1. A method of generating an image comprising:
   maintaining, at a display control device, a frame buffer having display data for an entire image, the display data comprising pixel data for each pixel of the image;
   receiving a signal over a general purpose data connection at the display control device, the signal comprising encoded display data for one or more rectangular groups of pixel tiles within the image, the display data comprising display data for less than the whole of the image, and position data indicating a position of the or each rectangular group of pixel tiles within the image, the display data being encoded using a Haar transform,
   obtaining a coefficient for the or each rectangular group of pixel tiles from the encoded display data,
   performing an inverse Haar transform on the obtained coefficients to generate pixel data for the or each rectangular group of pixel tiles,
   updating the frame buffer with the generated pixel data for the or each rectangular group of pixel tiles according to the position data for the or each rectangular group of pixel tiles, whereby the one or more groups of rectangular groups of pixel tiles of display data provide a partial update of the image, and
   outputting at least a portion of the frame buffer to a display over a display-specific data standard connection.

2. A method according to claim 1, wherein a pixel tile comprises an 8×8 array of pixels.

3. A method according to claim 1, wherein a rectangular group of pixel tiles comprises fewer than twenty pixel tiles.

4. A method according to claim 1, wherein obtaining a coefficient for the or each rectangular group of pixel tiles from the encoded display data comprises converting variable length bit fields in the encoded display data into AC coefficients.

5. A method according to claim 1, wherein the general purpose data connection comprises a USB connection or an Ethernet connection.

6. A method according to claim 1, wherein the display-specific data standard connection comprises a VGA, HDMI, DVI or DisplayPort connection.

7. A method according to claim 1, wherein the one or each rectangular group of pixel tiles of display data is located anywhere within the image.

8. A method according to claim 1, wherein the position data separately identifies the intended location of the one or each rectangular group of pixel tiles in the frame buffer.

9. A device for generating an image comprising:
   a frame buffer configured to store display data for an entire image, the display data comprising pixel data for each pixel of the image;
   a receiver arranged to receive a signal over a general purpose data connection, the signal comprising display data for one or more rectangular groups of pixel tiles within the image, the display data comprising display data for less than the whole of the image, and position data indicating a position of the or each rectangular group of pixel tiles within the image, the display data being encoded using a Haar transform,
   a processor arranged to obtain a coefficient for the or each rectangular group of pixel tiles from the encoded display data, to perform an inverse Haar transform on the obtained coefficients to generate pixel data for the or each rectangular group of pixel tiles and to update the frame buffer with the generated pixel data for the or each rectangular group of pixel tiles according to the position data for the or each rectangular group of pixel tiles, whereby the one or more groups of rectangular groups of pixel tiles of display data provide a partial update of the image, and
   an output device arranged to output at least a portion of the frame buffer to a display over a display-specific data standard connection.

10. A device according to claim 9, wherein a pixel tile comprises an 8×8 array of pixels.

11. A device according to claim 9, wherein a rectangular group of pixel tiles comprises fewer than twenty pixel tiles.

12. A device according to claim 9, wherein the processor is arranged, when obtaining a coefficient for the or each rectangular group of pixel tiles from the encoded display data, to convert variable length bit fields in the encoded display data into AC coefficients.

13. A device according to claim 9, wherein the receiver comprises a USB port or an Ethernet port.

14. A device according to claim 9, wherein the display-specific data standard connection comprises a VGA, HDMI, DVI or DisplayPort connection.

15. A device according to claim 9, wherein the one or each rectangular group of pixel tiles of display data is located anywhere within the image.

16. A device according to claim 9, wherein the position data separately identifies the intended location of the one or each rectangular group of pixel tiles in the frame buffer.

17. A system for generating an image comprising:
a computer arranged to encode display data for one or more rectangular groups of pixel tiles within an image and position data indicating a position of each of the rectangular groups of pixel tiles within the image, the display data being less than the display data for an entire image, the encoding using a Haar transform for each pixel tile and transmit an encoded signal of the encoded display data to a display control device over a general purpose data connection,
a display control device comprising:
    a frame buffer configured to store display data for an entire image, the display data comprising pixel data for each pixel of the image;
    a receiver arranged to receive the signal over the general purpose data connection, the signal comprising the encoded display data for one or more rectangular groups of pixel tiles within the image and the position data for the or each rectangular group of pixel tiles,
    a processor arranged to obtain a coefficient for the or each rectangular group of pixel tiles from the encoded display data, to perform an inverse Haar transform on the obtained coefficients to generate pixel data for the or each rectangular group of pixel tiles and to update the frame buffer with the generated pixel data for the or each rectangular group of pixel tiles according to the position data for the or each rectangular group of pixel tiles, whereby the one or more groups of rectangular groups of pixel tiles of display data provide a partial update of the image, and
    an output device arranged to output at least a portion of the frame buffer to a display over a display-specific data standard connection.

18. A system according to claim 17, wherein a pixel tile comprises an 8×8 array of pixels.

19. A system according to claim 17, wherein a rectangular group of pixel tiles comprises fewer than twenty pixel tiles.

20. A system according to claim 17, wherein the processor is arranged, when obtaining a coefficient for the or each rectangular group of pixel tiles from the encoded display data, to convert variable length bit fields in the encoded display data into AC coefficients.

21. A system according to claim 17, wherein the receiver comprises a USB port or an Ethernet port.

22. A tangible non-transitory computer readable medium including executable instructions which, when executed in a processing system, cause the processing system to:
    maintain, at a display control device, a frame buffer having display data for an entire image, the display data comprising pixel data for each pixel of the image;
    receive a signal over a general purpose data connection at the display control device, the signal comprising display data for one or more rectangular groups of pixel tiles within the image, the display data comprising display data for less than the whole of the image, and position data indicating a position of the or each rectangular group of pixel tiles within the image, the display data being encoded using a Haar transform,
    obtain a coefficient for the or each rectangular group of pixel tiles from the encoded display data,
    perform an inverse Haar transform on the obtained coefficients to generate pixel data for the or each rectangular group of pixel tiles,
    update the frame buffer with the generated pixel data for the or each rectangular group of pixel tiles according to the position data for the or each rectangular group of pixel tiles, whereby the one or more groups of rectangular groups of pixel tiles of display data provide a partial update of the image, and
    output at least a portion of the frame buffer to a display over a display-specific data standard connection.

23. A tangible non-transitory computer readable medium according to claim 22, wherein a pixel tile comprises an 8×8 array of pixels.

24. A tangible non-transitory computer readable medium according to claim 22, wherein a rectangular group of pixel tiles comprises fewer than twenty pixel tiles.

25. A tangible non-transitory computer readable medium according to claim 22, wherein causing the processing system to obtain a coefficient for the or each rectangular group of pixel tiles from the encoded display data comprises causing the processing system to convert variable length bit fields in the encoded display data into AC coefficients.

26. A tangible non-transitory computer readable medium according to claim 22, wherein the general purpose data connection comprises a USB connection or an Ethernet connection.

* * * * *